United States Patent
Someya et al.

(10) Patent No.: US 9,608,855 B2
(45) Date of Patent: Mar. 28, 2017

(54) TIME CONTROL APPARATUS, TIME CONTROL METHOD, AND PROGRAM

(71) Applicant: Sony Corporation, Tokyo (JP)

(72) Inventors: Ikuo Someya, Tokyo (JP); Toshihiko Hamamatsu, Saitama (JP); Toshiaki Kojima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 599 days.

(21) Appl. No.: 13/747,838

(22) Filed: Jan. 23, 2013

(65) Prior Publication Data

US 2013/0191486 A1  Jul. 25, 2013

(30) Foreign Application Priority Data

Jan. 24, 2012  (JP) ................................ 2012-011711

(51) Int. Cl.
   G06F 15/16   (2006.01)
   H04L 12/24   (2006.01)
   H04J 3/06    (2006.01)
(52) U.S. Cl.
   CPC ............ H04L 41/04 (2013.01); H04J 3/0667 (2013.01); H04J 3/0685 (2013.01)
(58) Field of Classification Search
   CPC ... H04L 41/04; H04N 5/91; H04J 3/06; G06F 1/12
   USPC .......................................................... 370/503
   See application file for complete search history.

(56) References Cited

U.S. PATENT DOCUMENTS

| 7,103,124 B1* | 9/2006 | Lindskog ............. H04J 3/0667 375/354 |
| 7,447,931 B1* | 11/2008 | Rischar et al. ................ 713/400 |
| 8,081,663 B2* | 12/2011 | Tamura .......................... 370/503 |
| 9,100,135 B2* | 8/2015 | Tosti | |
| 2003/0014679 A1* | 1/2003 | Domon ..................... G06F 1/14 713/400 |
| 2005/0207387 A1* | 9/2005 | Middleton ............ H04J 3/0664 370/347 |
| 2010/0085885 A1* | 4/2010 | Sakurada .............. H04J 3/0667 370/252 |

(Continued)

FOREIGN PATENT DOCUMENTS

JP    2010-190635    9/2010

*Primary Examiner* — Aftab N. Khan
(74) *Attorney, Agent, or Firm* — Frommer Lawrence & Haug LLP; William S. Frommer

(57) ABSTRACT

A time control apparatus provided in a slave machine and synchronizing time information with time information of a master machine connected over a network includes: calculation units respectively calculating time difference candidates of the slave machine with respect to the master machine and network delays indicative of an average of times necessary for communication of first and second messages over the network based on transmission and reception times of the first messages which are transmitted from the master machine and received using the slave machine and transmission and reception times of the second messages which are transmitted from the slave machine and received using the master machine; a selection unit selecting one of the calculated time difference candidates as a time difference based on the calculated network delays; and an adjustment unit adjusting the time information of the slave machine based on the selected time difference.

3 Claims, 5 Drawing Sheets

(56) References Cited

U.S. PATENT DOCUMENTS

| | | | | |
|---|---|---|---|---|
| 2010/0085989 A1* | 4/2010 | Belhadj | ................ | H04J 3/0667 370/503 |
| 2010/0209070 A1* | 8/2010 | Inomata | ................... | G04G 7/02 386/207 |
| 2011/0161701 A1* | 6/2011 | Blixt | ....................... | H03L 1/026 713/320 |

* cited by examiner

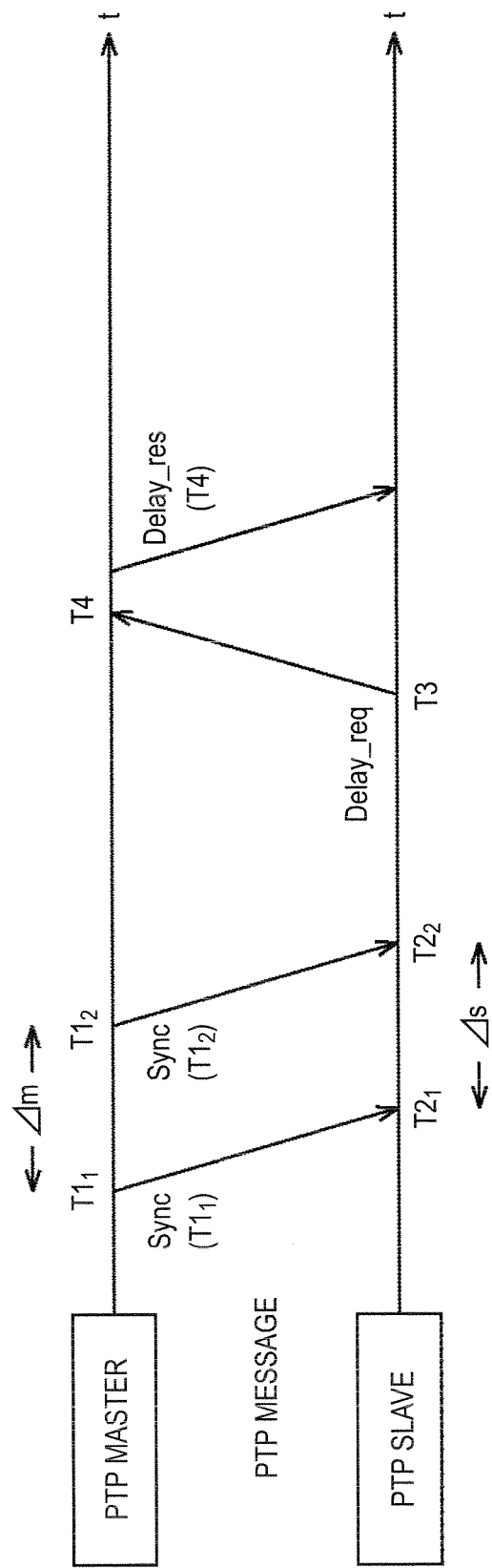

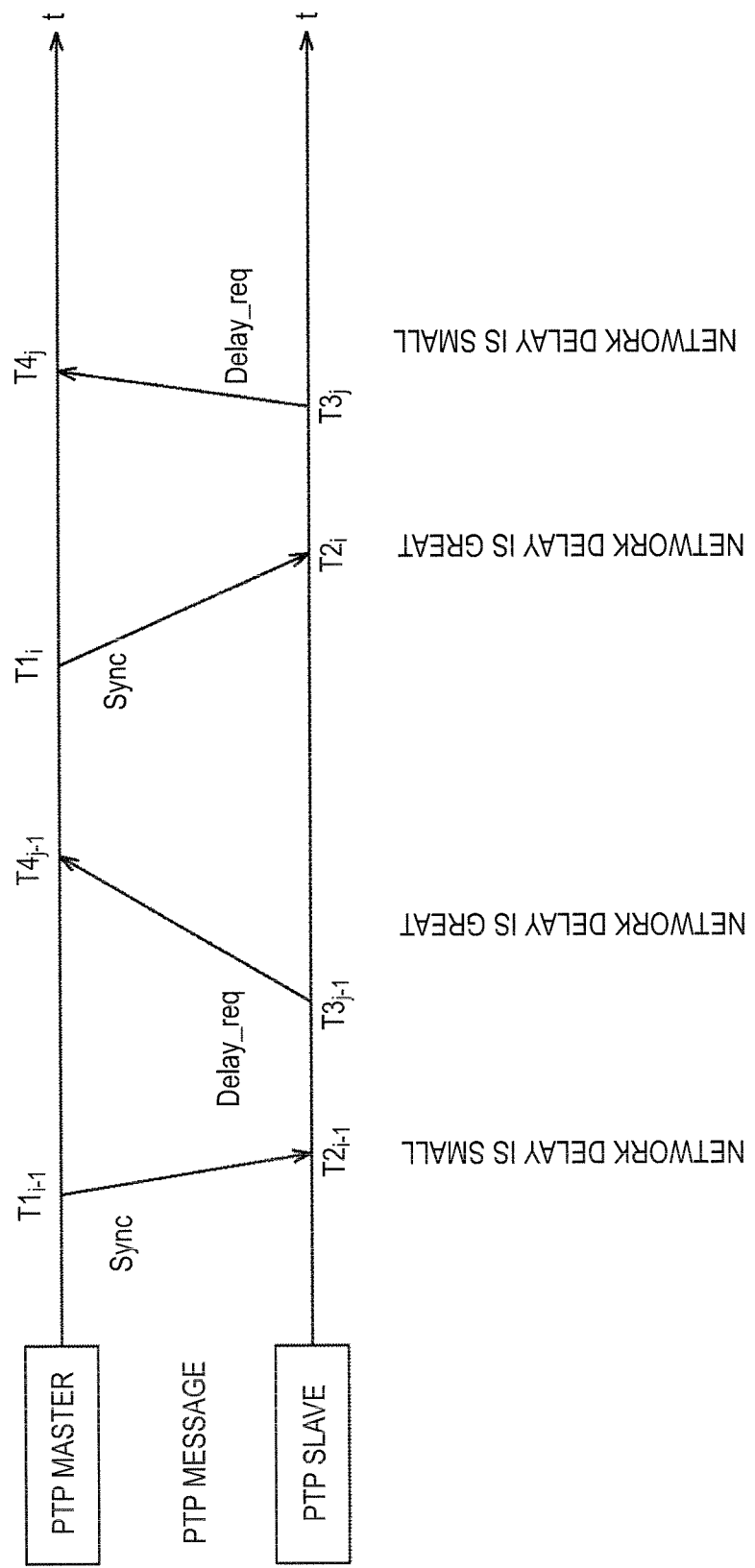

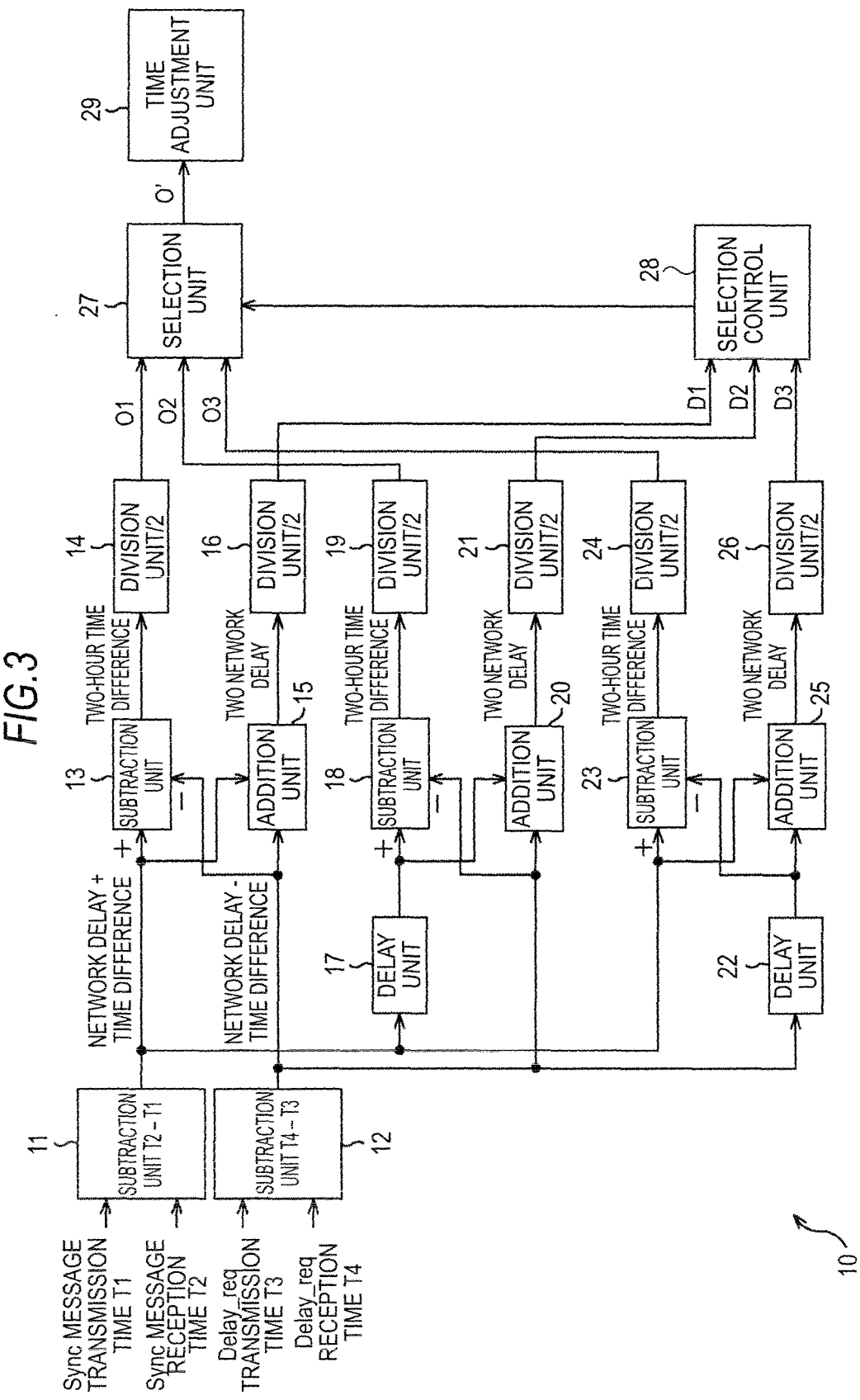

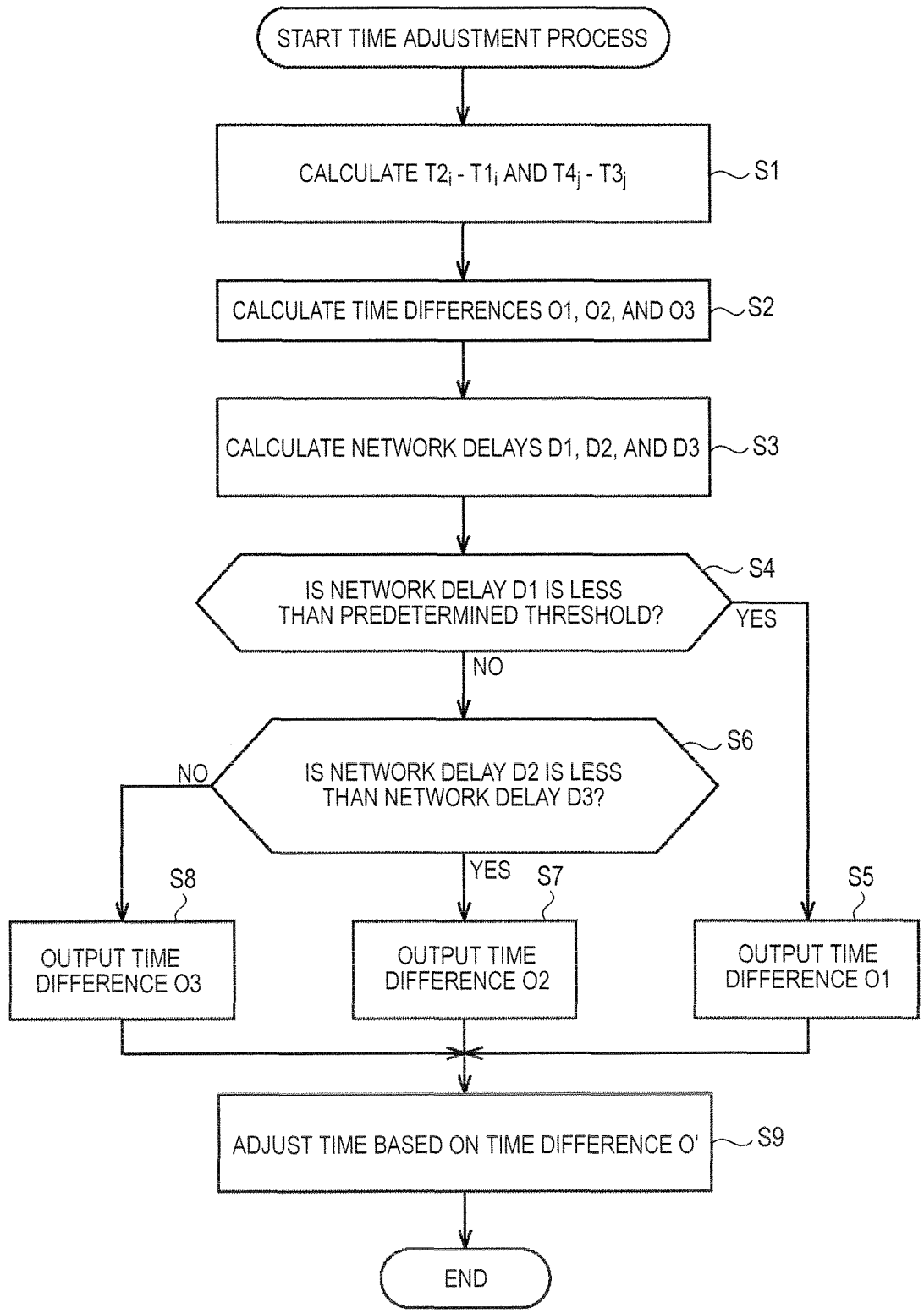

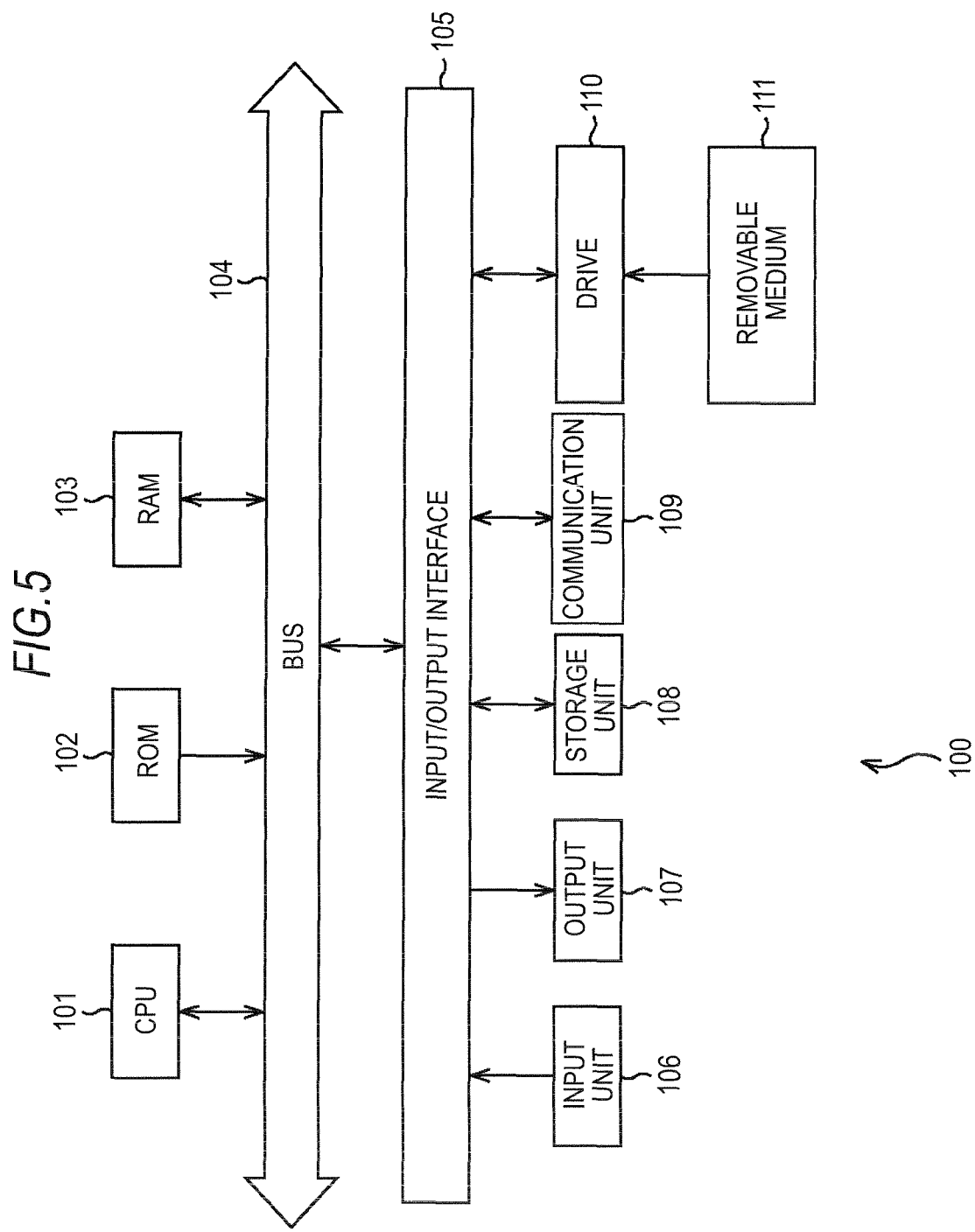

TIME CONTROL APPARATUS, TIME CONTROL METHOD, AND PROGRAM

FIELD

The present disclosure relates to a time control apparatus, a time control method, and a program, and, in particular, to a time control apparatus, a time control method, and a program which are suitable for being used when time information is synchronized with that of a master machine connected over a network with high precision.

BACKGROUND

In the related art, there is provided a structure in which the respective internal time information of apparatuses which are connected over a network are synchronized, and IEEE 1588 PTP (Precision Time Protocol) has been known as a representative thereof (for example, refer to JP-A-2010-190635).

According to IEEE 1588 PTP, by transmitting PTP messages between a master machine (hereinafter, referred to as "PTP master") and a slave machine (hereinafter, referred to as "PTP slave") which are connected over a network, it is possible to synchronize the time information of a PTP slave with the time information of a PTP master with a high sub-μ sec precision. In detail, an internal oscillation frequency f2 of the PTP slave is synchronized with an internal oscillation frequency f1 of the PTP master, and, thereafter, the time information of the PTP slave is synchronized with the time information of the PTP master.

Hereinafter, a process of synchronizing the internal oscillation frequency f2 of the PTP slave with the internal oscillation frequency f1 of the PTP master is called frequency synchronization, and a process of synchronizing the time information of the PTP slave with the time information of the PTP master is called time synchronization.

FIG. 1 illustrates an overview of a high-precision time synchronization process using IEEE 1588 PTP according to the related art.

The PTP master transmits Sync message which functions as a PTP message including a transmission time $T1_i$ which is the time information of the PTP master on the network during a predetermined period $\Delta m$ based on the oscillation frequency f1. Meanwhile, the PTP slave extracts the transmission time $T1_i$ included in Sync message in response to the reception of Sync message which is transmitted from the PTP master, and reads a reception time $T2_i$ which is the time information of the PTP slave. That is, the PTP slave acquires the transmission time $T1_i$ and the reception time $T2_1$ whenever a Sync packet is received.

In addition, the PTP slave transmits Delay_req message which functions as a PTP message to the PTP master over the network, and reads a transmission time T3 which is the time information of the PTP slave. Meanwhile, the PTP master reads a reception time T4 which is the time information of the PTP master in response to the reception of Delay_req message, and transmits Delay_res message, which functions as a PTP message including the reception time T4, to the PTP slave as a reply. Therefore, the PTP slave acquires the transmission time T3 of Delay_req message from the PTP slave and the reception time T4 of the PTP master by transmitting Delay_req message and receiving Delay_res message which is the answer in response to Delay_req message.

Here, it is assumed that a time which a necessary for the transmission of PTP messages, such as Sync message, Delay_req message, and Delay_res message, over the network (hereinafter, referred to as a "network delay time") is not changed and is usually uniform.

Under this assumption, if the oscillation frequency f1 of the PTP master is equal to the oscillation frequency f2 of the PTP slave, the transmission interval of Sync message of the PTP master $\Delta m = T1_2 - T1_1$ is equal to the reception interval of Sync message of the PTP slave $\Delta s = T2_2 - T2_1$. In other words, in a case in which the difference between $\Delta m$ and $\Delta s$, that is, $\Delta m - \Delta s$ is not 0, the case can be said that there are errors between the oscillation frequency f1 of the PTP master and the oscillation frequency f2 of the PTP slave, thus oscillation frequencies are not synchronized.

Therefore, with respect to the frequency synchronization, the oscillation frequency f2 of the PTP slave may be adjusted such that the difference between $\Delta m$ and $\Delta s$, that is, $\Delta m - \Delta s$ (hereinafter, referred to as "frequency deviation") is 0 in the PTP slave. The frequency deviation $\Delta m - \Delta s$ is calculated using the following Equation 1.

$$\text{Frequency deviation } \Delta m - \Delta s = (T1_2 - T1_1) - (T2_2 - T2_1) = (T2_1 - T1_1) - (T2_2 - T1_2) \quad (1)$$

With respect to the time synchronization, time difference shown in Equation 4 may be calculated based on the transmission time $T1_2$ and the reception time $T2_2$ of Sync message and the transmission time T3 and the reception time T4 of Delay_req message in the PTP slave, and an internal clock T2 may be adjusted such that the time difference is 0 in the PTP slave.

$$\text{Network delay of Sync message} = (T2_2 - \text{time difference}) - T1_2 = (T2_2 - T1_2) - \text{time difference} \quad (2)$$

$$\text{Network delay of Delay\_req message} = T4 - (T3 - \text{time difference}) = (T4 - T3) + \text{time difference} \quad (3)$$

It is assumed that the network delay of Sync message=the network delay of Delay_req message=uniform. Therefore, with respect to the time difference, subsequent Equation 4 is derived by subtracting Equation 3 from Equation 2.

$$\text{Time difference} = \{(T2_2 - T1_2) - (T4 - T3)\}/2 \quad (4)$$

In addition, with respect to the network delay, subsequent Equation 5 is derived by adding Equation 2 to Equation 3.

$$\text{Network delay} = \{(T2_2 - T1_2) + (T4 - T3)\}/2 \quad (5)$$

SUMMARY

However, if a high-capacity packet, such as an image signal, is flowed at high speed on a relevant network in which the PTP master is connected to the PTP slave, congestion occurs on the network, thus temporal increase may occur in the above-described network delay time of the PTP message.

For example, as shown in FIG. 2, there may be a case in which the network delay of Delay_req message ($T4_{j-1} - T3_{j-1}$) increases compared to the network delay of Sync message ($T2_{i-1} - T1_{i-1}$). In addition, on the contrary, there may be a case in which the network delay of Delay_req message ($T4_j - T3_1$) decreases compared to the network delay of Sync message ($T2_i - T1_i$).

In these cases, since the above-described assumption that the network delay time of the PTP message is uniform is not realized, it is difficult to accurately perform the frequency synchronization or the time synchronization using the above-described method.

It is therefore desirable to enable time synchronization to be performed with a master machine on a network with high precision.

An embodiment of the present disclosure is directed to a time control apparatus which is provided in a slave machine and synchronizes time information with time information of a master machine connected over a network, the time control apparatus including: a plurality of calculation units that respectively calculate time difference candidates of the slave machine with respect to the master machine and network delays indicative of an average of a time which is necessary for communication of first messages over the network and a time which is necessary for communication of second messages over the network based on transmission and reception times of the first messages which are transmitted from the master machine and received using the slave machine and transmission and reception times of the second messages which are transmitted from the slave machine and received using the master machine; a selection unit that selects one of the plurality of calculated time difference candidates as a time difference based on the plurality of calculated network delays; and an adjustment unit that adjusts the time information of the slave machine based on the selected time difference.

The plurality of calculation units may respectively calculate the time difference candidates and the network delays based on the respective transmission/reception times of the first messages and the second messages which are combined from the plurality of first messages and the plurality of second messages which have different communication timings.

The plurality of calculation units may include first to third calculation units, the first calculation unit may calculate a first time difference candidate and a first network delay based on a transmission/reception time of a latest first message which is transmitted from the master machine and received using the slave machine and a transmission/reception time of a latest second message which is transmitted from the slave machine and received using the master machine, the second calculation unit may calculate a second time difference candidate and a second network delay based on a transmission/reception time of an immediately previous first message which is transmitted from the master machine and received using the slave machine and a transmission/reception time of the latest second message which is transmitted from the slave machine and received using the master machine, and the third calculation unit may calculate a third time difference candidate and a third network delay based on the transmission/reception time of the latest first message which is transmitted from the master machine and received using the slave machine and a transmission/reception time of an immediately previous second message which is transmitted from the slave machine and received using the master machine.

The selection unit may select the first time difference candidate as the time difference when the first network delay is less than a threshold value, may select the second time difference candidate as the time difference when the first network delay is equal to or greater than the threshold value and the second network delay is less than the third network delay, and may select the third time difference candidate as the time difference when the first network delay is equal to or greater than the threshold value and the second network delay is equal to or greater than the third network delay.

Another embodiment of the present disclosure is directed to a time control method of a time control apparatus which is provided in a slave machine and synchronizes time information with time information of a master machine connected over a network, the time control method including: calculating time difference candidates of the slave machine with respect to the master machine and network delays indicative of an average of a time which is necessary for communication of first messages over the network and a time which is necessary for communication of second messages over the network based on transmission and reception times of the first messages which are transmitted from the master machine and received using the slave machine and transmission and reception times of the second messages which are transmitted from the slave machine and received using the master machine; selecting one of the plurality of calculated time difference candidates as a time difference based on the plurality of calculated network delays; and adjusting the time information of the slave machine based on the selected time difference using the time control apparatus.

Still another embodiment of the present disclosure is directed to a program causing a computer, which is provided in a slave machine and synchronizes time information with time information of a master machine connected over a network, to function as: a plurality of calculation units that respectively calculate time difference candidates of the slave machine with respect to the master machine and network delays indicative of an average of a time which is necessary for communication of the first messages over the network and a time which is necessary for communication of the second messages over the network based on transmission/reception times of first messages which are transmitted from the master machine and received using the slave machine and transmission/reception times of second messages which are transmitted from the slave machine and received using the master machine; a selection unit that selects one of the plurality of calculated time difference candidates as a time difference based on the plurality of calculated network delays; and an adjustment unit that adjusts the time information of the slave machine based on the selected time difference.

In the embodiments of the present disclosure, the plurality of time difference candidates of the slave machine with respect to the master machine and the plurality of network delays each indicative of an average of the time which is necessary for communication of the first messages over the network and the time which is necessary for communication of the second messages over the network based on a plurality of combinations of the transmission/reception times of the first messages which are transmitted from the master machine and received using the slave machine and the transmission/reception times of the second messages which are transmitted from the slave machine and received using the master machine is provided. One of the plurality of calculated time difference candidates is selected as the time difference based on the plurality of calculated network delays, and the time information of the slave machine is adjusted based on the selected time difference.

According to the embodiments of the present disclosure, it is possible to perform time synchronization with the master machine on the network with high precision.

BRIEF DESCRIPTION OF THE DRAWINGS

FIG. 1 is a view illustrating an overview of a high-precision time synchronization process using IEEE 1588 PTP according to the related art;

FIG. 2 is a view illustrating an example in which network delays are changed;

FIG. 3 is a block diagram illustrating an example of the configuration of a time control apparatus to which the present disclosure is applied;

FIG. 4 is a flowchart illustrating a time adjustment process using the time control apparatus; and FIG. 5 is a block diagram illustrating an example of the configuration of a computer.

DETAILED DESCRIPTION

Hereinafter, modes for implement the present disclosure (hereinafter, referred to as an "embodiment") will be described in detail with reference to the accompanying drawings.

A time control apparatus according to an embodiment of the present disclosure is included in a PTP slave (slave machine) which synchronizes time information with time information of a PTP master in such a way as to transmit and receive a PTP message to and from the PTP master (master machine) on a network. In addition, frequency synchronization is performed in advance prior to this time synchronization, thus the oscillation frequency f2 of the PTP slave is synchronized with the oscillation frequency f1 of the PTP master with high precision.

[Example of Configuration of Time Control Apparatus]

FIG. 3 illustrates an example of the configuration of the time control apparatus according to the embodiment. A time control apparatus 10 calculates network delays D1, D2, and D3 which respectively correspond to 3 types of time differences O1, O2, and O3, selects one of the time differences O1, O2, and O3 based on the network delays D1 to D3, and adjusts time information according to the selected time difference.

In addition, the time difference O1 and the network delay D1 are calculated based on the transmission/reception times of the latest Sync message and the latest Delay_req message. The time difference O2 and the network delay D2 are calculated based on the transmission/reception times of a previous Sync message and the latest Delay_req message. The time difference O3 and the network delay D3 are calculated based on the transmission/reception times of the latest Sync message and a previous Delay_req message.

The time control apparatus 10 includes subtraction units 11 and 12. Further, the time control apparatus 10 includes a subtraction unit 13, a division unit 14, an addition unit 15, and a division unit 16 as configurations used to calculate the time difference O1 and the network delay D1. In addition, the time control apparatus 10 includes a delay unit 17, a subtraction unit 18, a division unit 19, an addition unit 20, and a division unit 21 as configurations used to calculate the time difference O2 and the network delay D2. In addition, the time control apparatus 10 includes a delay unit 22, a subtraction unit 23, a division unit 24, an addition unit 25, and a division unit 26 as configurations used to calculate the time difference O3 and the network delay D3. Furthermore, the time control apparatus 10 includes a selection unit 27, a selection control unit 28, and a time adjustment unit 29.

The subtraction unit 11 subtracts a transmission time $T1_i$ from a reception time $T2_i$ of the latest Sync message which is received using the PTP slave, and outputs the result to the subtraction unit 13, the addition unit 15, the delay unit 17, the subtraction unit 23, and the addition unit 25.

The subtraction unit 12 subtracts a transmission time $T3_j$ from a reception time $T4_j$ of the PTP master in the latest Delay_req message which is transmitted from the PTP slave, and outputs the result to the subtraction unit 13, the addition unit 15, the subtraction unit 18, the addition unit 20, and the delay unit 22.

The subtraction unit 13 and the division unit 14 calculate Equation 4. That is, the time difference O1 is calculated by subtracting $(T4_j-T3_j)$ which is the output of the subtraction unit 12 from $(T2_i-T1_i)$ which is the output of the subtraction unit 11 and dividing the result by 2, and the time difference O1 is output to the selection unit 27.

The addition unit 15 and the division unit 16 calculate Equation 5. That is, the network delay D1 is calculated by adding $(T2_i-T1_i)$ which is the output of the subtraction unit 11 to $(T4_j-T3_j)$ which is the output of the subtraction unit 12 and dividing the result by 2, and the network delay D1 is output to the selection control unit 28.

The delay unit 17 maintains $(T2_i-T1_i)$ which is the output of the subtraction unit 11. When input is subsequently received from the subtraction unit 11, the delay unit 17 outputs $(T2_{i-1}-T1_{i-1})$ which is maintained until that time to the subtraction unit 18 and the addition unit 20.

The subtraction unit 18 and the division unit 19 calculate Equation 4. That is, the time difference O2 is calculated by subtracting $(T4_j-T3_j)$ which is the output of the subtraction unit 11 from $(T2_{i-1}-T1_{i-1})$ which is the output of the delay unit 17, and dividing the result by 2, and the time difference O2 is output to the selection unit 27.

The addition unit 20 and the division unit 21 calculate Equation 5. That is, the network delay D2 is calculated by adding $(T2_{i-1}-T1_{i-1})$ which is the output of the delay unit 17 to $(T4_j-T3_j)$ which is the output of the subtraction unit 11 and dividing the result by 2, and the network delay D2 is output to the selection control unit 28.

The delay unit 22 maintains $(T2_j-T1_j)$ which is the output of the subtraction unit 12. When input is received from the subtraction unit 12, the delay unit 22 outputs $(T2_{j-1}-T1_{j-1})$ which is maintained until that time to the subtraction unit 23 and the addition unit 25.

The subtraction unit 23 and the division unit 24 calculate Equation 4. That is, the time difference O3 is calculated by subtracting $(T4_{j-1}-T3_{j-1})$ which is the output of the delay unit 22 from $(T2_i-T1_i)$ which is the output of the subtraction unit 11 and dividing the result by 2, and the time difference O3 is output to the selection unit 27.

The addition unit 25 and the division unit 26 calculate Equation 5. That is, the network delay D3 is calculated by adding $(T2_i-T1_i)$ which is the output of subtraction unit 11 to $(T4_{j-1}-T3_{j-1})$ which is the output of the delay unit 22 and dividing the result by 2, and the network delay D3 is output to the selection control unit 28.

The selection unit 27 selects any one of the time difference O1 which is input from the division unit 14, the time difference O2 which is input from the division unit 19, and the time difference O3 which is input from the division unit 24 under the control of the selection control unit 28, and outputs the selected time difference to the time adjustment unit 29 as time difference O'.

The selection control unit 28 controls a selection process performed using the selection unit 27 based on the network delay D1 which is input from the division unit 16, the network delay D2 which is input from the division unit 21, and the network delay D3 which is input from the division unit 26.

The time adjustment unit 29 adjusts the internal time information of the PTP slave such that the time difference O' which is input from the selection unit 27 is 0.

[Operation Description]

Subsequently, the operation of the time control apparatus 10 will be described. FIG. 4 is a flowchart illustrating the time adjustment process performed using the time control apparatus 10.

The time adjustment process is periodically performed at predetermined intervals. In addition, it is assumed that the frequency synchronization is performed prior to the time adjustment process.

In step S1, the subtraction unit 11 calculates and outputs $(T2_i-T1_i)$. The subtraction unit 12 calculates outputs $(T4_j-T3_j)$.

In step S2, the subtraction unit 13 and the division unit 14 calculate the time difference $O1=\{(T2_i-T1_i)-(T4_j-T3_j)\}/2$ and output the result to the selection unit 27. The subtraction unit 18 and the division unit 19 calculate the time difference $O2=\{(T2_{i-1}-T1_{i-1})-(T4_j-T3_j)\}/2$ and outputs the result to the selection unit 27. The subtraction unit 23 and the division unit 24 calculates the time difference $O3=\{(T2_i-T1_i)-(T4_{j-1}-T3_{j-1})\}/2$ and outputs the results to the selection unit 27.

In step S3, the addition unit 15 and the division unit 16 calculate the network delay $D1=\{(T2_i-T1_i)+(T4_j-T3_j)\}/2$ and output the result to the selection control unit 28. The addition unit 20 and the division unit 21 calculate the network delay $D2=\{(T2_{i-1}-T1_{i-1})+(T4_j-T3_j)\}/2$ and output the result to the selection control unit 28. The addition unit 25 and the division unit 26 calculate the network delay $D3=\{(T2_i-T1_i)+(T4_{j-1}-T3_{j-1})\}/2$ and output the result to the selection control unit 28.

In addition, in actual fact, the process in step S2 and the process in step S3 are performed at the same time.

In step S4, the selection control unit 28 determines whether or not the network delay D1 is less than a predetermined threshold value. If a result of the determination is affirmative, the process proceeds to step S5. In step S5, the selection unit 27 selects the time difference O1 which is input from the division unit 14 under the control performed using the selection control unit 28, and outputs the selected time difference O1 to the time adjustment unit 29 as the time difference O'.

If the result of the determination performed in step S4 is negative, the process proceeds to step S6. In step S6, the selection control unit 28 determines whether or not the network delay D2 is less than the network delay D3. If a result of the determination is affirmative, the process proceeds to step S7. In step S7, the selection unit 27 selects the time difference O2 which is input from the division unit 19 under the control performed using the selection control unit 28, and outputs the selected time difference O2 to the time adjustment unit 29 as the time difference O'.

If the result of the determination performed in step S6 is negative, the process proceeds to step S8. In step S8, the selection unit 27 selects the time difference O3 which is input from the division unit 24 under the control performed using the selection control unit 28, and outputs the selected time difference O3 to the time adjustment unit 29 as the time difference O'.

In step S9, the time adjustment unit 29 adjusts the internal time information of the PTP slave such that the time difference O' which is input from the selection unit 27 is 0. As above, the time adjustment process is terminated.

According to the above-described time adjustment process, if the network delay D1, which is calculated based on the latest Sync message and the transmission/reception time of the latest Delay_req message which are considered that a communication timing is the nearest, that is, variation in the network delays is the least, is less than the threshold value, time information is adjusted based on the time difference O1.

In addition, if the network delay D1 is equal to or greater than the predetermined threshold value, the network delay D2, which is calculated based on the previous Sync message and the transmission/reception time of the latest Delay_req message, is compared with the network delay D3, which is calculated based on the latest Sync message and the transmission/reception time of the previous Delay_req message. Thereafter, the time information is adjusted based on the time difference O2 or O3 which corresponds to the lesser.

That is, according to the time adjustment process, since the time difference, which corresponds to the combination of the Synch message having less change in the network delay and the Delay_req message, is selected and used to adjust the time, it is possible to synchronize the time information of the PTP slave with the time information of the PTP master with high precision compared to the related art.

In addition, if the network delay D1 is equal to or a greater than the predetermined threshold value and the lesser of the network delay D2 and the network delay D3 is greater than the predetermined threshold value, the time difference O' may not be output to the time adjustment unit 29 and the adjustment of the time information may be postponed until a subsequent time adjustment process.

Further, for example, the network delays D1 to D3 are compared and the time difference corresponding to the minimum thereof may be set to the time difference O'.

In addition, although the time difference and the network delay are calculated by combining the latest Sync message with the first Delay_req message or the latest Delay_req message with the previous Sync message in the embodiment, the present disclosure is not limited thereto. For example, the time difference and the network delay may be calculated by combining the latest Sync message with an n-th Delay_req message or the latest Delay_req message with the n-th previous Sync message.

Further, although the time difference O' is selected from among the calculated three types of time difference, O1 to O3 in the embodiment, four or more types time difference may be calculated and the time difference O' may be selected therefrom.

Meanwhile, a series of processes performed using the above-described time control apparatus 10 can be performed using hardware and software. When the series of processes is performed using software, a program included in the software is installed in a computer. Here, the computer includes a computer which is incorporated with dedicated hardware or, for example, a general-purpose personal computer which can perform various types of functions by installing various types of programs.

FIG. 5 is a block diagram illustrating an example of the configuration of the hardware of the computer which performs the above-described series of processes using a program.

In the computer, a Central Processing Unit (CPU) 101, a Read Only Memory (ROM) 102, and a Random Access Memory (RAM) 103 are connected to each other via a bus 104.

Further, an input/output interface 105 is connected to the bus 104. An input unit 106, an output unit 107, a storage unit 108, a communication unit 109, and a drive 110 are connected to the input/output interface 105.

The input unit 106 includes a keyboard, a mouse, and a microphone. The output unit 107 includes a display, and a speaker. The storage unit 108 includes a hard disk and a nonvolatile memory. The communication unit 109 includes a network interface. The drive 110 drives a removable media 111 such as a magnetic disc, an optical disc, a magneto-optical disk, or a semiconductor memory.

In the computer which is configured as described above, the above-described series of processes is performed in such a way that the CPU 101 loads a program stored in, for example, the storage unit 108 to the RAM 103 and executes the program via the input/output interface 105 and the bus 104.

The program executed using the computer (CPU 101) can be recorded in the removable media 111 which functions as, for example, a package media, and can be provided. In addition, the program can be provided via a wired or wireless transmission media such as a local area network, the Internet, and digital satellite broadcasting.

In the computer, the program can be installed in the storage unit 108 via the input/output interface 105 by mounting the removable media 111 on the drive 110. In addition, the program can be received using the communication unit 109 via a wired or wireless transmission media, and can be installed in the storage unit 108. In addition, the program can be installed in the ROM 102 or the storage unit 108 in advance.

In addition, the program which is executed using the computer may be a program, the process of which is performed in chronological order according to the order described in the present specification, and may be a program, the process of which is performed in parallel or at a necessary timing that a call is made.

In addition, the embodiment of the present disclosure is not limited to the above-described embodiment, and various types of modifications are possible without departing the gist of the present disclosure.

The present disclosure contains subject matter related to that disclosed in Japanese Priority Patent Application JP 2012-011711 filed in the Japan Patent Office on Jan. 24, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A time control apparatus which synchronizes time information of a slave machine with time information of a master machine connected to the slave machine over a network, comprising:

the slave machine configured to receive from the master machine (a) a latest first message that includes time of transmission data representing the time ($T1_i$) the latest first message is transmitted and (b) an immediately previous first message that includes time of transmission data representing the time ($T1_{i-1}$) the immediately previous first message is transmitted, the slave machine further configured to (c) acquire a reception time ($T2_i$) at which the latest first message is received at the slave machine, (d) to acquire a reception time ($T2_{i-1}$) at which the immediately previous first message is received at the slave machine, (e) to transmit a latest second message to the master machine and acquire a transmission time ($T3_j$) at which the latest second message is transmitted from the slave machine, (f) to transmit an immediately previous second message to the master machine and acquire a transmission time ($T3_{j-1}$) at which the immediately previous second message is transmitted from the slave machine, (g) to receive from the master machine a message representing a reception time ($T4_j$) at which the latest second message is received at the master machine, and (h) to receive from the master machine a message representing a reception time ($T4_{j-1}$) at which the immediately previous second message is received at the master machine, the time control apparatus comprising:

a first calculation unit configured to calculate a first time difference candidate and a first network delay based on the transmission time $T1_i$, the reception time $T2_i$, the transmission time $T3_j$ and the reception time $T4_j$, a second calculation unit configured to calculate a second time difference candidate and a second network delay based on the transmission time $T1_{i-1}$ and the reception time $T2_{i-1}$ and the transmission time $T3_j$ and reception time $T4_j$, a third calculation unit configured to calculate a third time difference candidate and a third network delay based on the transmission time $T1_i$ and the reception time $T2_i$ and the transmission time $T3_{j-1}$ and the reception time $T4_{j-1}$, the first and second messages being combined from a plurality of first messages and a plurality of second messages which have different communication timings;

a selection unit configured to select the first time difference candidate as the selected time difference when the first network delay is less than a threshold value, to select the second time difference candidate as the selected time difference when the first network delay is equal to or greater than the threshold value and the second network delay is less than the third network delay, and to select the third time difference candidate as the selected time difference when the first network delay is equal to or greater than the threshold value and the second network delay is equal to or greater than the third network delay; and an adjustment unit that adjusts the time information of the slave machine based on the selected time difference.

2. A time control method for synchronizing time information of a slave machine with time information of a master machine connected to the slave machine over a network, comprising:

receiving at the slave machine from the master machine (a) a latest first message that includes time of transmission data representing the time ($T1_i$) the latest first message is transmitted and (b) an immediately previous first message that includes time of transmission data representing the time ($T1_{i-1}$) the immediately previous first message is transmitted, acquiring at the slave machine (c) a reception time ($T2_i$) at which the latest first message is received at the slave machine, (d) a reception time ($T2_{i-1}$) at which the immediately previous first message is received at the slave machine, transmitting to the master machine from the slave machine (e) a latest second message and acquiring a transmission time ($T3_j$) at which the latest second message is transmitted from the slave machine, (f) an immediately previous second message to the master machine and acquiring a transmission time ($T3_{j-1}$) at which the immediately previous second message is transmitted from the slave machine, receiving from the master machine (g) a message representing a reception time ($T4_j$) at which the latest second message is received at the master machine, and (h) a message representing a reception time ($T4_{j-1}$) at which the immediately previous second message is received at the master machine, calculating a first time difference candidate and a first network delay based on the transmission time $T1_i$, the reception time $T2_i$, the transmission time $T3_j$ and the reception time $T4_j$, calculating a second time difference candidate and a second network delay based on the transmission time $T1_{i-1}$ and the reception time $T2_{i-1}$ and the transmission time $T3_j$ and the reception time $T4_j$, calculating a third time difference candidate and a third network delay based on the transmission time $T1_i$ and the reception time $T2_i$ and the transmission time $T3_{j-1}$ and the reception time $T4_{j-1}$, the first and second messages being combined from a plurality of first messages and a plurality of second messages which have different communication timings;

selecting the first time difference candidate as the selected time difference when the first network delay is less than a threshold value, selecting the second time difference candidate as the selected time difference when the first network delay is equal to or greater than the threshold value and the second network delay is less than the third network delay, and selecting the third time difference candidate as the selected time difference when the first network delay is equal to or greater than the threshold value and the second network delay is equal to or greater than the third network delay; and adjusting the time information of the slave machine based on the selected time difference using the time control apparatus.

3. A non-transitory computer readable medium on which is stored a program causing a computer, which is provided in a slave machine to synchronize time information of the slave machine with time information of a master machine connected to the slave machine over a network:

wherein, the non-transitory computer readable medium when in operation, the slave machine receives from the master machine (a) a latest first message that includes time of transmission data representing the time ($T1_i$) the latest first message is transmitted and (b) an immediately previous first message that includes time of transmission data representing the time ($T1_{i-1}$) the immediately previous first message is transmitted, and the slave machine acquires (c) a reception time ($T2_i$) at which the latest first message is received at the slave machine, (d) and a reception time ($T2_{i-1}$) at which the immediately previous first message is received at the slave machine, and the slave machine transmits (e) a latest second message to the master machine and acquire a transmission time ($T3_j$) at which the latest second message is transmitted from the slave machine, and (f) an immediately previous second message to the master machine and acquires a transmission time ($T3_{j-1}$) at which the immediately previous second message is transmitted from the slave machine, and the slave machine receives (g) from the master machine a message representing a reception time ($T4_j$) at which the latest second message is received at the master machine, and (h) a message representing a reception time ($T4_{j-1}$) at which the immediately previous second message is received at the master machine, the program causes the computer to function as:

a first calculation unit configured to calculate a first time difference candidate and a first network delay based on the transmission time $T1_i$, the reception time $T2_i$, the transmission time $T3_j$ and the reception time $T4_j$, a second calculation unit configured to calculate a second time difference candidate and a second network delay based on the transmission time $T1_{i-1}$ and the reception time $T2_{i-1}$ and the transmission time $T3_j$ and the reception time $T4_j$, a third calculation unit configured to calculate a third time difference candidate and a third network delay based on the transmission time $T1_i$ and the reception time $T2_i$ and the transmission time $T3_{j-1}$ and the reception time $T4_{j-1}$, the first and second messages being combined from a plurality of first messages and a plurality of second messages which have different communication timings;

a selection unit configured to select the first time difference candidate as the selected time difference when the first network delay is less than a threshold value, to select the second time difference candidate as the selected time difference when the first network delay is equal to or greater than the threshold value and the second network delay is less than the third network delay, and to select the third time difference candidate as the selected time difference when the first network delay is equal to or greater than the threshold value and the second network delay is equal to or greater than the third network delay; and an adjustment unit that adjusts the time information of the slave machine based on the selected time difference.

* * * * *